United States Patent [19]

Douno et al.

[11] Patent Number: 4,745,265

[45] Date of Patent: May 17, 1988

[54] AUTOMATIC CHECK CARD ISSUING APPARATUS

[75] Inventors: Shugo Douno; Fumio Miyanaga; Hiroshi Tomiyama; Haruo Odagiri, all of Himeji, Japan

[73] Assignee: Glory Kogyo Kabushiki Kaisha, Hyogo, Japan

[21] Appl. No.: 759,607

[22] Filed: Jul. 26, 1985

[30] Foreign Application Priority Data

Feb. 6, 1984 [JP] Japan ................................. 59-19803

[51] Int. Cl.[4] ............................................. G06F 15/30
[52] U.S. Cl. .................................. 235/379; 235/493; 360/2
[58] Field of Search ....................... 235/379, 380, 493; 360/2

[56] References Cited

U.S. PATENT DOCUMENTS

| 3,245,697 | 4/1966 | Nugent | 235/493 X |
| 4,106,062 | 8/1978 | Foote | 360/2 X |
| 4,277,837 | 7/1981 | Stuckert | 235/380 X |
| 4,450,348 | 5/1984 | Stockburger et al. | 235/493 X |
| 4,454,414 | 6/1984 | Benton | 235/379 |
| 4,686,357 | 8/1987 | Douno et al. | 235/419 X |

Primary Examiner—David L. Trafton
Attorney, Agent, or Firm—Koda and Androlia

[57] ABSTRACT

In commercial transactions, settlement is conventionally made by cash or by checks drawn from a current account in a bank. Users of such checking system enjoy its convenience. In the conventional process of check negotiation, however, such system involves a vast amount of complicated procedures including several steps of mechanical as well as manual processing. An automatic check card issuing apparatus for issuing check cards to the customer who draws a check from a financial institution such as bank, etc. is a great advantage to the financial institution as well as to the user. Check cards may be promptly issued by a simple operation according to the present invention.

14 Claims, 9 Drawing Sheets

AUTOMATIC CHECK CARD ISSUING APPARATUS

BACKGROUND OF THE INVENTION

The present invention relates to an automatic check card issuing apparatus to which is connected or mounted a check card drawing apparatus owned by a client so as to enable automatic issuance of check cards by recording and inputting the prescribed data.

In conventional commercial transactions, settlement is by cash, and by checks drawn on a current account in a bank, etc. Users of such checking system enjoy its advantages. From the standpoint of banks, however, such system involves a vast amount of complicated clerical procedures, and a number of negotiation checks pose a bottleneck in rationalizing the banking business.

We will now briefly refer to the procedure for handling checks at a bank, etc. A user such as a firm or an entreprenuer opens a current account with a bank based on which the bank issues a check book containing a number of checks printed with the user's account number (including the bank and branch codes) by means of, for example, magnetic ink character recognition (MICR). The user draws a check by writing a sum of money by hand or by a check-writer. The recipient then submits the check to a clerk at his/her bank to be deposited in his account. The bank first records all such checks on a microfilm and then print thereon the respective amount using an MICR encoder. The checks then are sorted out into their own checks and other bank checks. Those checks issued by other banks are stamped for clearing and are brought to a regional clearing house to which the bank (or branch) belongs. Checks from different banks collected at the clearing house are sorted out according to banks by means of an MICR reader/sorter, and a balance sheet of different banks is also made. Each bank takes back its checks and confirms the balance of the drawer's account. This is done within a predetermined period of time (i.e., one day after clearing). For the cases with insufficient fund in the account during this period, the bank which received such checks is notified of the conditions so that the amount thereof is credited to the bearer's account. Upon expiration of such period, the drawn amount is automatically credited to the bearer's account in other cases and the bank concerned settles payment according to the balance sheet mentioned above. As for the own checks issued by themselves, the fund of the drawer's account is confirmed by means of an on-line system and if sufficient, the check is honored and credited to the bearer's account.

Thus the conventional process of check drawing or negotiation involves a vast amount of complicated procedures including several steps of mechanical as well as manual banding. There is also a risk of illicit use if the check book is lost or stolen unless the loss or theft thereof is reported to the bank immediately. In addition to securing safe keeping of the checks, it is also desirable for the customers of financial institutions using checks to automatically and simply draw a check card without involving manual handling. Automation of check card issuing system reduces the amount of operation at financial institutions, and offers an advantage to the customers that they can draw a check at any time.

SUMMARY OF THE INVENTION

The present invention was contrived based on the above points, and aims at providing a check card issuing apparatus in which process of issuing checks by financial institutions such as a bank to the customer is carried out automatically.

The present invention also aims to provide an apparatus to automatically issue check cards which present illicit use thereof.

The nature, principle and utility of the invention will become more apparent from the following detailed description when read in conjunction with the accompanying drawings.

DETAILED DESCRIPTION OF THE INVENTION

Figure 1:
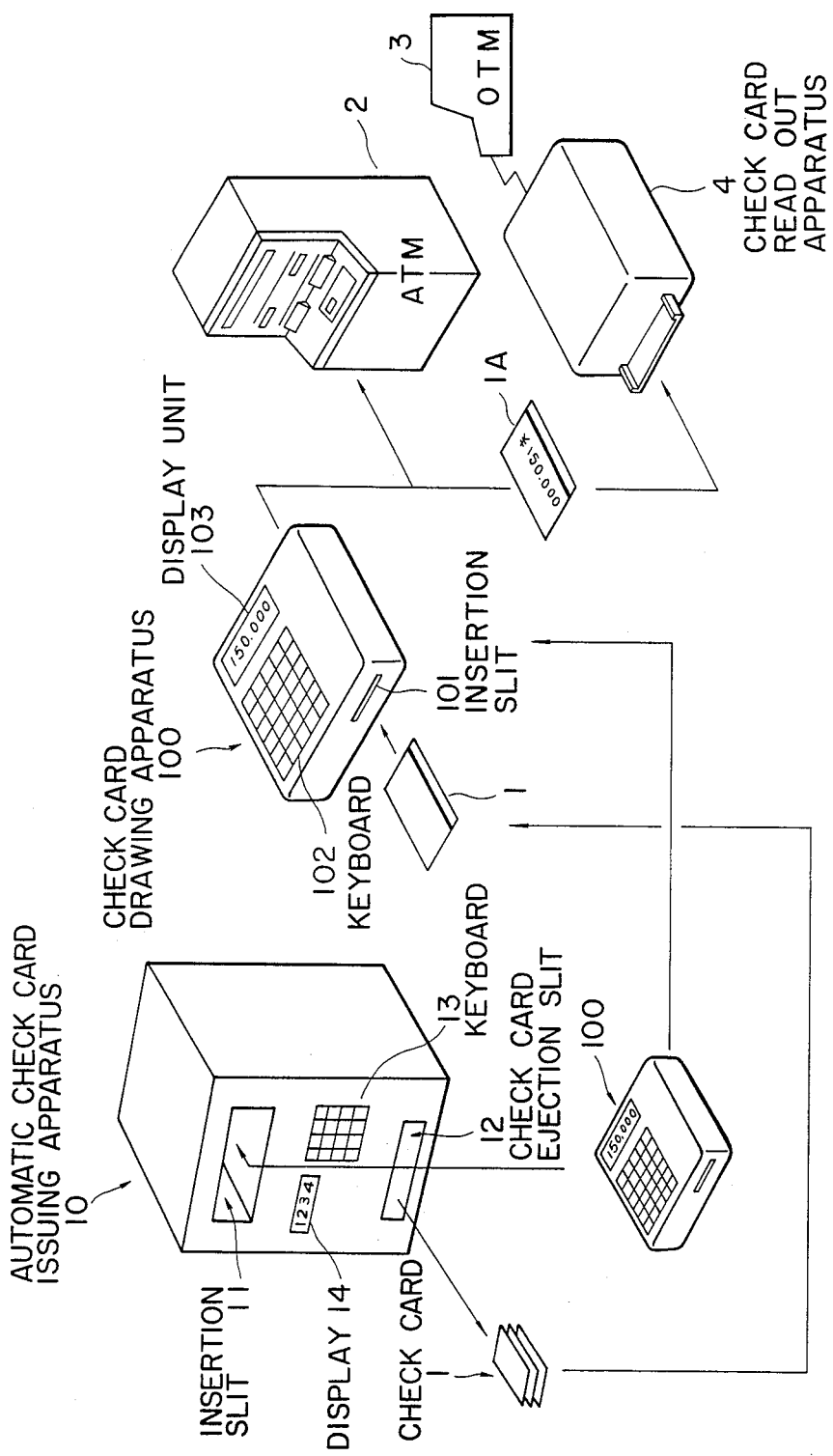
FIG. 1 is a structural view showing an example of check negotiation system using the check card automatic issuing apparatus according to the present invention.
Figure 2A:
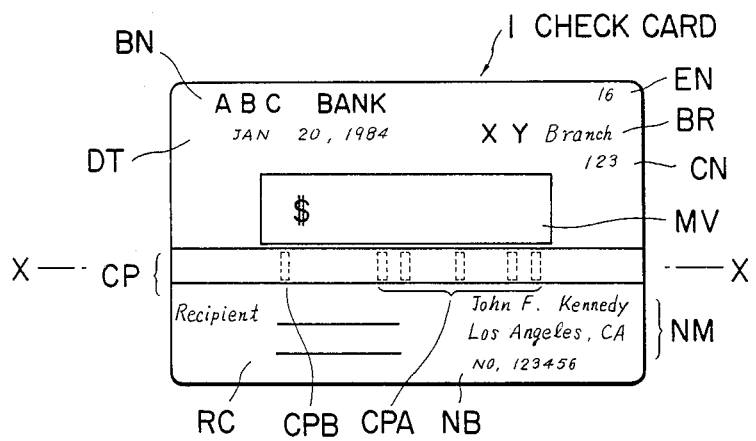
FIG. 2A is a front view showing one example of the check card to be used in the present invention.
Figure 2B:
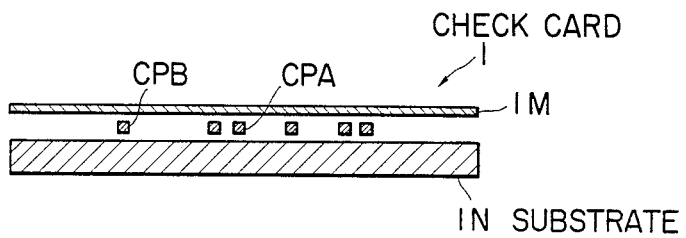
FIG. 2B is a cross sectional view along the line X—X in FIG. 2A.
Figure 2C:
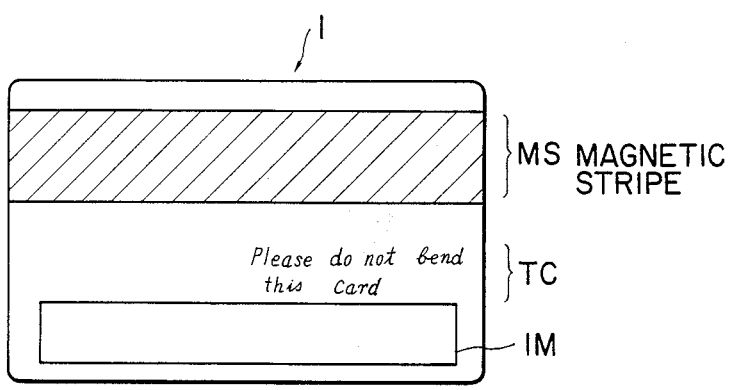
FIG. 2C is the back view of the check card shown in FIG. 2A.
Figure 3:
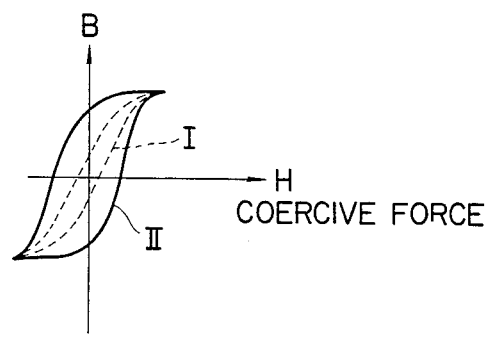
FIG. 3 is a graph showing the magnetic characteristics of the magnetic material to be contained in the printing material for bar code.

FIG. 1 shows the outline of the check negotiating system comprising an automatic check card issuing apparatus 10 according to the present invention and a check card drawing apparatus 100. A customer who has a current account with a certain financial institution is given by contract or otherwise check card drawing apparatus 100 to be described hereinbelow. The automatic check card issuing apparatus 10 is installed in a prescribed corner of the financial institution. An insertion slit 11 for inserting the check card drawing apparatus 100 which a customer brings with him/her on the upper front side of the automatic check card issuing apparatus 10 and a check card ejection slit 12 to eject issued check cards in a lot is provided in the lower front side. Between the insertion slit 11 and the ejection slit 12 are provided a keyboard 13 for inputting necessary data and a display 14 to display input/output data and handling instructions. A check card 1 issued from the automatic check card issuing apparatus 10 is, as shown in FIGS. 2A through 2C, a rectangular sheet and similar to those widely used as a cash card (so called quick card, bank card, etc.), and is provided with a magnetic stripe MS on a portion of its back. The check card 1 may be made of hard paper and is provided at a prescribed position on the front with an identification area CP to magnetically read out identification characteristics specific to each check card 1. There is further provided an area MV for printing the check amount on top thereof. In the identification area CP of the check card 1 provided in the upper part of the substrate IN thereof data are printed (press printing) as the first and the second bar codes CPA and CPB. The first bar code CPA is different binary pattern given to each card at the manufacturing stage and is printed on the substrate IN in an ink containing a magnetic material with a particular coercive force (for example, the characteristics I of FIG. 3) to form a characteristic data inherent to each check card 1. Like the first bar code CPA, the second bar code CPB is similarly printed (or provided as a layer) on the substrate, but the printing ink used contains a magnetic material with higher (or lower) coercive force (for example, the characteristic II of FIG. 3). This second bar code CPB is provided in the prescribed position in a binary pattern common to all media.

A masking band IM consisting of a translucent and non-magnetic material is placed over the identification area CP concealing the first bar code CPA and the second bar code CPB to thereby prevent the user or a third party from observing the bar codes CPA and CPB under the band IM. The masking may be provided so as to cover the whole surface of the base IN or printed with an appropriate picture, a photo or characters on the surface.

The data in the identification area CP of the check card 1 as above can be read out by characteristics detecting device 200 in the check card issuing apparatus 10 and the check card drawing apparatus 100.

Figure 4:
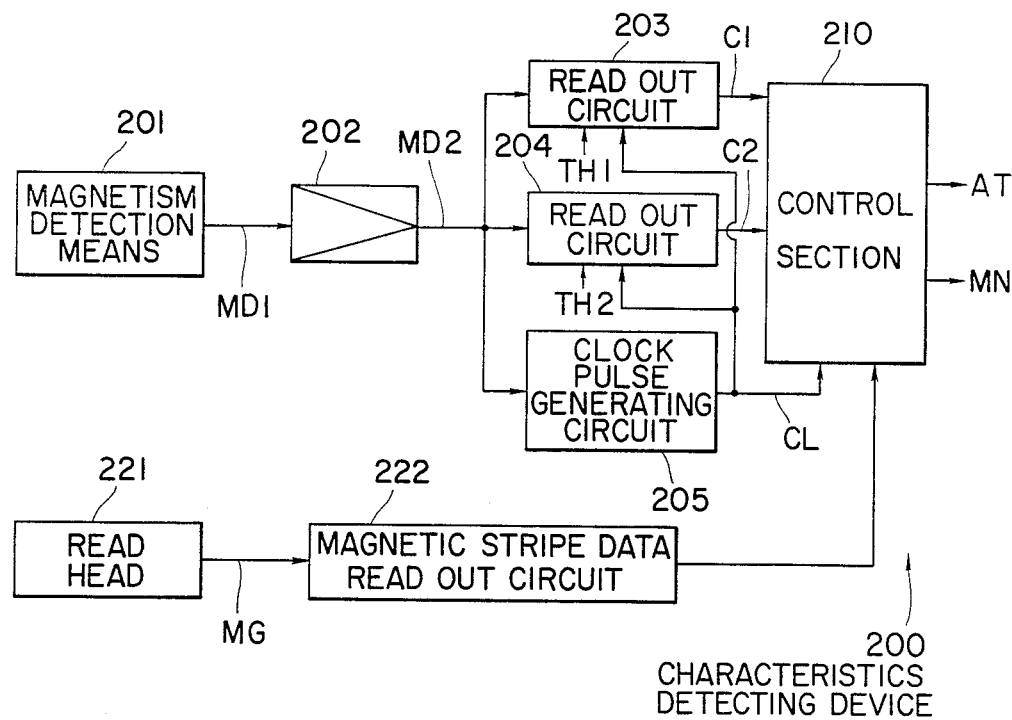
FIG. 4 is a block diagram showing circuits of the characteristic detecting device.
Figure 5:
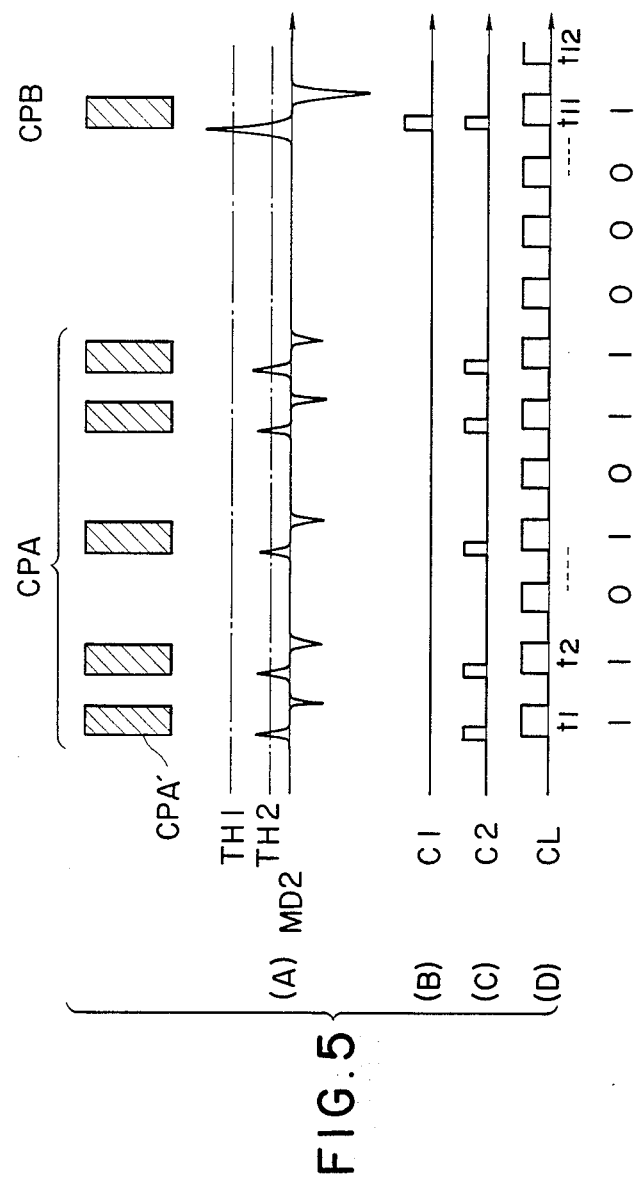
FIG. 5 is timing charts showing one example of operation according to the present invention.

The reading-out operation of this characteristic data is now explained by referring to the block diagram of this characteristics detecting device 200 shown in FIG. 4 and the timing charts in FIG. 5.

When the check card 1 advances into the characteristics detecting device 200, the bar codes CPA and CPB are magnetized through the masking band IM by a magnetizing means (not shown). In this case, the bar code CPA is magnetized with the characteristics I shown in FIG. 3 and CPB with that shown II in FIG. 3 respectively so that the bar codes CPA and CPB have different degrees of coercive force H. The bar codes CPA and CPB thus magnetized are detected by a magnetism detection means 201 such as a magnetic head along with the advance of the check card 1. The detection means 201, in other words, detects residual magnetism on the bar codes CPA, CPB, and an amplifier 202 to output a detection signal MD2 as shown in (5A) of FIG. 5 which rises or falls by the changes in the magnetic flux at the front and rear ends of the bar code. On detecting the first bit bar code CPA' (time point t1) a clock pulse generating circuit 205 outputs a clock pulse CL as shown in (5D) of FIG. 5. The threshold value TH1 of a read out circuit 203 is set at a high level as shown in (5A) of FIG. 5 whereas the threshold value TH2 of a read out circuit 204 is set at a low level. The read out circuit 203 synchronizes with the clock pulse CL and detects pulses of detecting signal MD2 higher than the threshold value TH1 to read out the information of the bar codes CPA and CPB as shown in (5B) of FIG. 5, and outputs the same as C1. The read out circuit 204 detects a pulse of a detection signal MD2 higher than the the threshold value TH2 and outputs the same as C2 as shown in (5C) of FIG. 5. In this case, the level of the detection signal MD2 corresponding to the bar code CPB becomes high whereas the level of the detecting signal MD2 corresponding to the bar code CPA becomes low. If the threshold value TH1 of the read out circuit 203 is set higher than the pulse level of the bar code CPA and smaller than the pulse level of the bar code CPB, and the threshold value TH2 of the read out circuit 204 is set lower than the pulse level of the bar code CPA, the read out circuit 203 can read out the information of the bar code CPB alone while the read out circuit 204 reads the information of the bar codes CPA and CPB.

A control section 210 comprising of CPU, etc. collates the information C2 read out from the bar codes CPA and CPB by the read out circuit 204 and the information of the bar codes CPA and CPB detected from a magnetic stripe MS to be described hereinbelow through a read head 221 and outputted from a magnetic stripe data read out circuit 222, and outputs a characteristic data signal AT subject to reading out of the information of the bar code CPB by the read out circuit 203. The bibliographical magnetic stripe data MN read out from a magnetic stripe MS to be described later is also outputted. The characteristic data signal AT outputted from a control section 210 confirms that the check card is neither forged nor altered.

Even if the forgery has been committed by reading out the magnetic stripe MS, alteration is still recognizable since the bar codes CPA and CPB cannot be read out. The alteration of the media is also recognizable even if the masking band IM has been forged by shaving the band and making a magnetic copy since the difference between the coercive force of the bar codes CPA and CPB is not detectable.

The coecive force on the bar codes CPA and CPB may be reverse to that described above so long as the difference can be read out by the two read out circuits. Combinations and the number of bars in a bar code are not limited to the embodiment, and the third and the fourth bar codes may be provided.

The characteristic data inherent to the check card 1 formed and read out described above is magnetically read out from the bar code band formed on the respective check card 1 and recorded on the magetic stripe MS before the card is given to the customer who has opened a current account with a financial institution such as bank or is issued from the automatic check card issuing apparatus 10. The number allotted to the financial institution such as the issuing bank, and those of the head or a branch office of such institution as well as the account number of the customer are recorded on the magnetic stripe MS. An area is also provided in the magnetic stripe MS to record the clearing house number, the check number, the amount, the number of accepting bank and the drawing data. The area MV for printing the amount of a check card 1 not yet issued is naturally left blank. The check card 1 is also provided with a title column BN to indicate the name of the financial institution such as bank, a data column DT to print the date when drawing the check card 1, a clearing house number column EN to indicate the number allotted to a clearing house, a branch name column BR to indicate the name of a branch or the head office of the financial institution and a serial number column CN to give the serial number of the check card issued. There are also provided below the identification area CP, a drawee column RC to write the name of a person for whom the check is drawn (for example, bearer), a drawer column NM to indicate the address and name (title) of the drawer and an account number column NB to indicate the number of the current account. A column TC to give handling instructions of the check card 1, and an identification column IM for the drawee to fill in the name of the drawer, etc. to identify the drawer are provided on the back of the check card 1, too. These columns may be in any arbitrary combination or placed on either side of the check card.

When the check card 1 as described above is inserted into the insertion slit 101 provided on the front side of the check card drawing apparatus 100, it is taken in by means of a conveying mechanism to be described later. Necessary data is inputted by means of a keyboard 102 containing ten keys and symbol keys. The drawer can confirm the operation by looking at figures (the amount) indicated on a display unit 103 which is provided at upper portion for the keyboard 102. When all the input opration is completed and the confirmation-key on the keyboard 102 is pushed, the drawn amount is printed in the amount area MV and at the same time a check (a check card) 1A with the amount recorded on the magnetic stripe MS is ejected from the ejection slit of the check card drawing apparatus 100. The check card is then delivered to the drawee (creditor) by the drawer.

A user who receives the check card 1A thus drawn inserts the same into the insertion slit of an automatic teller's machine (ATM) 2 provided at a financial institution such as bank for automatically paying into his account via an on-line system. It is also possible to cash to the check at the bank where the check card has been issued. By inserting the check card 1A into an exclusive check card read out apparatus 4 connected to an on-line teller's machine (OTM) 3 installed at a teller's window, the check card 1A can be credited to the bearer's account. When a check card is to be credited to an account or cashed via the ATM 2 or the OTM 3, the balance in the drawer's account must be ascertained. Therefore, the ATM 2 and the OTM 3 confirms the balance in the drawer's current account and allows crediting or cashing for an amount within the balance.

Figure 6:
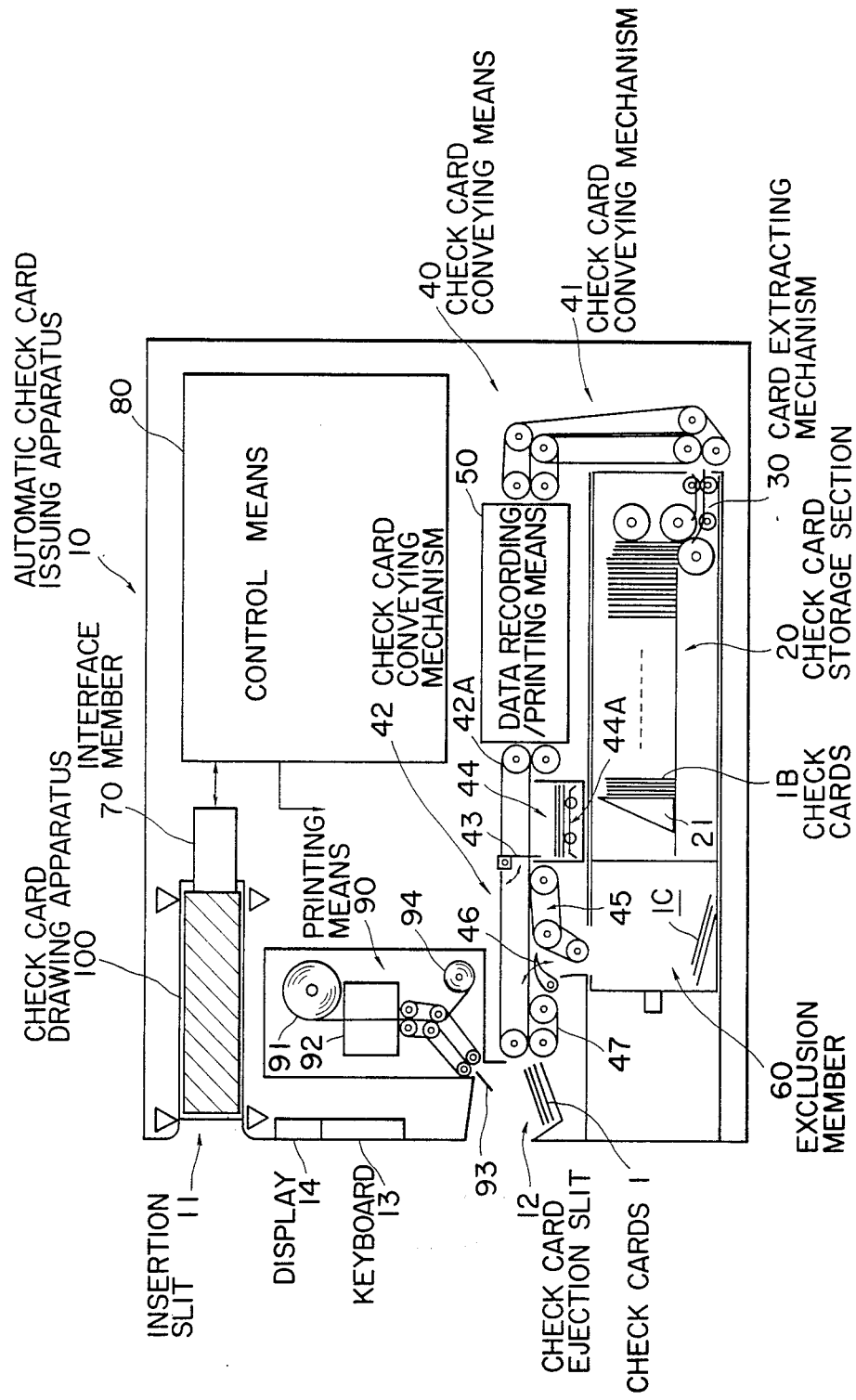
FIG. 6 is a schematic diagram showing one embodiment of the present invention.

The structure of the automatic check card issuing apparatus 10 is now explained by referring to FIG. 6.

Figure 7:
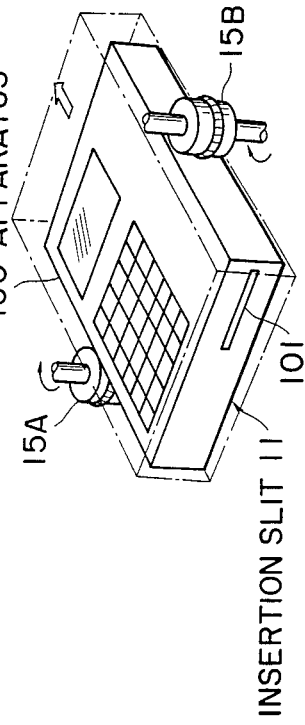
FIG. 7 is a view showing an example of mounting the check card drawing apparatus to the check card issuing apparatus of the present invention.

Check cards 1B not yet issued are standing in line as they are pressed by a slidable member 21 in a check card storage section 20 at the tip of which is provided a card extracting mechanism 30 for taking out the check cards 1B one by one. The check cards 1B ejected from the card extracting mechanism 30 are taken into a check card conveying mechanism 41 which comprises multiple pairs of rollers and two pairs of belts wound thereon. At the end of the conveying mechanism 41 is provided a data recording/printing means 50 which records and prints the data on the prescribed position of the conveyed check card 1B, and also detects with the characteristic detecting device 200 the characteristics of the identification area CP and records it on the magnetic stripe MS. A check card conveying mechanism 42 extending to the check card ejection slit 12 is provided at the rear side of the data recording/printing means 50. A check card conveying means 40 comprises the check card conveying mechanisms 41 and 42 and a conveying mechanism (not shown) in the data recording/printing means 50. The check card conveying mechanism 42 is so constructed that a temporary retaining section 44 where the check cards 1B being conveyed are abutted and dropped by a claw piece 43 made swingable in the direction shown by arrows, retained until they accumulate to a prescribed number, and then elevated by an elevating mechanism 44A comprising rollers, etc. for ejection in a lot, an intermediate conveying device 45 which conveys the prescribed number of check cards ejected from the temporary retaining section 44 by retaining them between the belts 42A, and claw member 46 which either removes the check cards conveyed by the intermediate conveying device 45 to an exclusion member 60 or conveys them to the final conveying device 47 in the rear for ejection. The check card 1 is issued from the ejection slit 12 from the end of the final conveying device 47. The check cards 1C removed into the exclusion member 60 can be separately taken out by the opening and closing of the door and the like. The check card drawing apparatus 100 mounted on the check card issuing apparatus 10 through the insertion slit 11 is connected to a control member 80 through an interface member 70. The control means 80 controls the card extracting mechanism 30, the check card conveying means 40 and the data recording/printing means 50. Mounting of the check card drawing apparatus 100 onto the check card issuing apparatus 10 is conducted as shown in FIG. 7. Rotating rollers 15A and 15B located on both sides of the insertion slit 11 help to carry out the mounting and dismounting process smoothly. In this case, either non-slip elements or racks may be provided on both sides of the check card drawing apparatus 100. A printing means 90 for journal printing the receipt of the issued check card to be handed out to the customer (the bearer of the check card drawing apparatus 100) or any proof of issuing the check card is also provided in the automatic check card issuing apparatus. In the printing means 90, a printer 92 prints on a sheet of roll paper 91 from which carbon copies can be made via control means 80. The printed sheet of paper is then cut to a predetermined length to issue a receipt 93 and is also retained by a journal 94.

Figure 8:
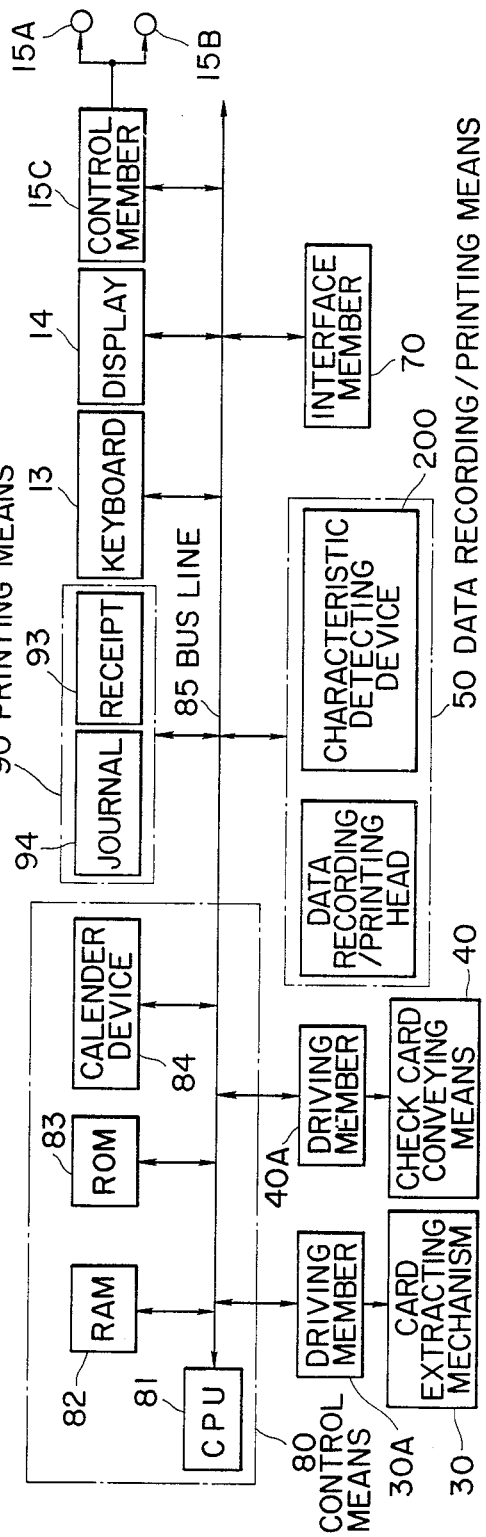
FIG. 8 is a block diagram of the control system for one embodiment of the present invention.

FIG. 8 shows the control system of the automatic check card issuing apparatus 10. A control means 80 comprises a CPU (such as micro-computer) 81 which controls the system as a whole, an RAM 82 which stores information fed from respective devices and reads out such information as required for processing, an ROM 83 which stores an operation program to be described later and a calender device 84 which outputs the date related data (the date, day of the week, hour and minute, etc.) when issuing a check card, the CPU 81 and the RAM 82, the ROM 83, a driving member 30A for the extracting mechanism 30, a driving member 40A of the conveying means 40 and others are mutually connected through a bus line 85. The number of check cards 1B stored in the storage section 20 is detected separately by a sensor, and ejection to the temporary retaining member 44 or to the ejection slit 12 are also separately detected by a sensor.

Figure 9:
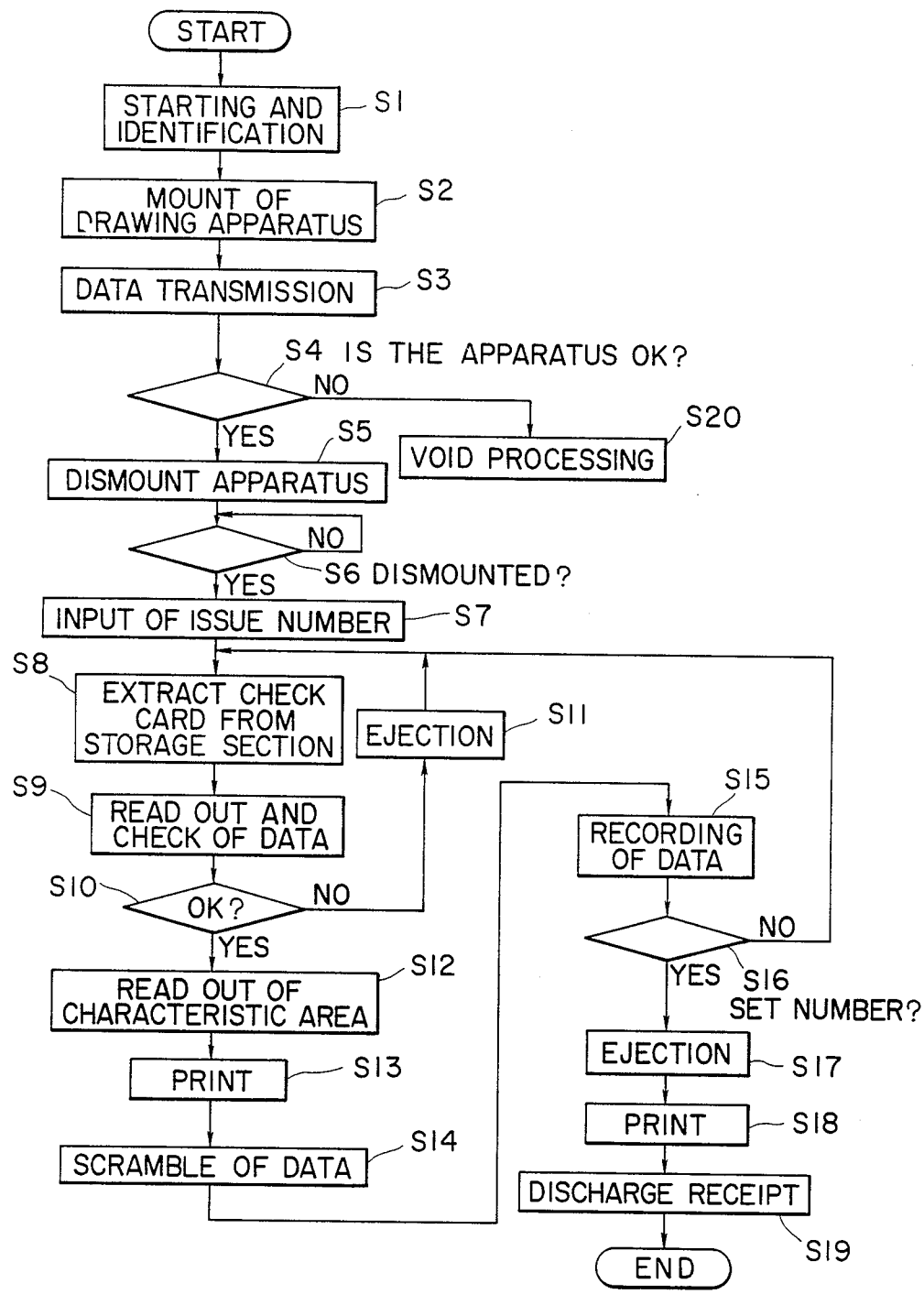
FIG. 9 is a flow chart showing operation of the present invention.

The operation of the apparatus having the above structure is now described by referring to the flow chart shown in FIG. 9.

For automatic issuance of check cards, a customer inputs the password agreed in advance (such as a code number, etc.) to his/her check card drawing apparatus 100 via a keyboard 102 to start the check card drawing apparatus 100 and to identify the bearer of the apparatus at the same time (Step S1). In this case, display by a lamp or output by sound may be used to indicate if the passwords coincide. After identifying the drawer and starting the check card drawing apparatus 100, the check card drawing apparatus 100 is mounted onto an automatic check card issuing apparatus 10 (Step S2). The check card drawing apparatus 100 inserted into an insertion slit 11 is detected by a sensor (not shown) and mounted onto the check card issuing apparatus 10 as shown in FIG. 7 by rotating rollers 15A and 15B provided on both sides of the insertion slit 11 and driven via a control member 15C. When the check card drawing apparatus 100 is thus mounted on the automatic check card issuing apparatus 10, data such as "the number allotted to the bank", "a branch office number", "the account number", "the address and name (title)" etc. given to the check card drawing apparatus 100 are read out (Step S3) through an interface member engaging the tip of the check card drawing apparatus 100, and the CPU 81 judges from the data read out whether the check card drawing apparatus is the one provided by the financial institution to the drawer (Step S4). If it is judged that the check card drawing apparatus is not the one given by the financial institution to the drawer, the display device 14 indicates the same and automatically returns the check card drawing apparatus or let the customer manually dismount the check card drawing apparatus (Step S20).

On the other hand, if the check card drawing apparatus is judged as the one given to the drawer by the particular financial institution in the Step S4, the display 14 indicates the same and the drawing apparatus is automatically returned or asks the customer to manually dismount the drawing apparatus (Step S5, S6). Dismounting the check card drawing apparatus 100 may be conducted after or immediately before the check cards 1 are issued. On dismounting the check card drawing apparatus 100 from the automatic check card issuing apparatus 10, the display 14 instructs the customer to input the desired number of check cards to be issued. The customer inputs the desired number via the keyboard 13 (Step S7). When the number is thus inputted via the keyboard 13, the card extracting mechanism 30 the and check card conveying means 40 are activated via the CPU 81 and the claw piece 43 is raised to the standing position as illustrated. Check cards 1B are taken out one by one from the check card storage section 20, fed to a conveying mechanism 41 (Step S8), and transferred by the check card conveying mechanism 41 to the data recording/printing means 50 where a read out head (not shown) reads out the numbers of the bank and the branch office recorded on the magnetic stripe MS in advance and judges if the numbers coincide with those of the automatic check card issuing apparatus (Step S9). When they coincide, a characteristic detecting device 200 in the data recording/printing means 50 detects and reads out the characteristics inherent to the identification area CP (Step S12), and the data recording/printing means 50 prints "the address, name (title) and account number" of drawer in the drawer column NM (Step S13). The data such as the name of financial institution, the number of its branch office, the number of clearing house, the account number and the serial number are scrambled over the characteristic data read out into codes (Step S14). The scrambled data are recorded on the magnetic stripe MS by the recording/printing means 50 (Step S15). The check cards 1B thus recorded with the data by the data recording/printing means 50 are further conveyed by the check card conveying mechanism 42 to abut the claw piece 43 on the way and drop into the temporary retaining member 44 below. A sensor (not shown) counts the retained number then. When the number in the temporary retaining member 44 does not reach the prescribed number, the process is reversed up to the Step S8 and the above mentioned extracting and conveying operations are repeated (Step S16). In case the data do not coincide in the above Steps S9 and S10, an elevating mechanism 44A in the temporary retaining member 44 is raised and the claw piece 43 is rotated to the lateral position and a claw member 46 to the standing position and the advancing check card is removed into an exclusion member 60 togeter with the check cards already retained in the temporary retaining member 44, and the process is reversed up to the Step S8. In this case the check card conveyed by an intermediate conveying device 45 abuts the claw member 46 and drops into the exclusion member 60 below by its curved guide.

On the other hand, when the number of retained check cards reaches a prescribed number, the claw piece 43 and the claw member 46 are rotated to lateral positions to be moved off the conveying passage. The elevating mechanism 44A then rises to transfer the check cards in the temporary retaining member 44 in a lot to an intermediate conveying device 45 and then to a final conveying mechanism 47 to be ejected in a lot from the end thereof the ejection slit 12 (Step S17). At the same time a printer 92 in the printing means 90 prints necessary data on a sheet of roll paper 91 (Step S18) and a receipt 93 is discharged into the ejection slit 12 (Step S19). A journal 94 is reserved in the check card issuing apparatus 10 as the issuing record. The check card issuing operation is thus completed when the customer receives the check cards 1 and the receipt 93 ejected through the ejection slit 12.

Each check card 1 issued as above is inserted into the check card drawing apparatus 100 by the customer to be drawn as a check card 1A. The out line of the check card drawing apparatus 100 is now described.

Figure 10:
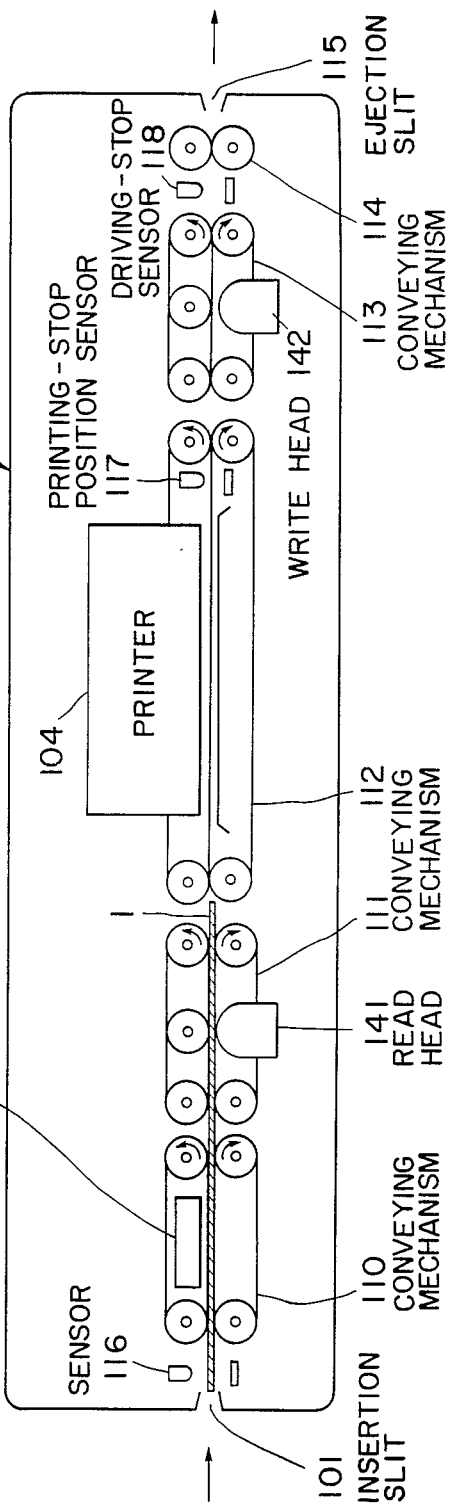
FIG. 10 is a schematic diagram showing an example of the check card drawing apparatus to be used in the present invention.
Figure 11:
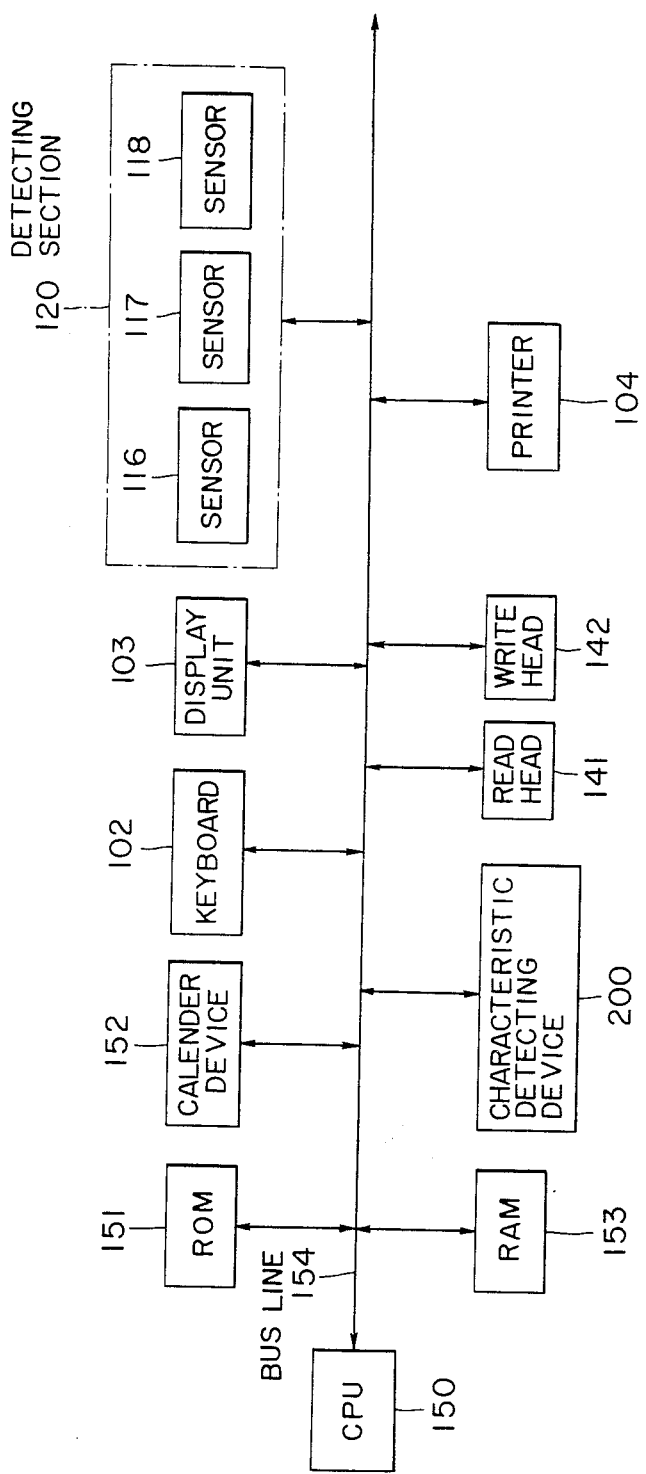
FIG. 11 is a block diagram showing the control system thereof.

FIG. 10 shows a schematic diagram of the check card drawing apparatus 10 and FIG. 11 a block diagram to show its control system.

The check card 1 inserted into an insertion slit 101 is conveyed to an ejection slit 115 via a conveying mechanisms 110 to 114 driven by a motor. The conveying mechanisms 110 to 114 convey the check card 1 which is interposed between a pair of upper and lower belt conveyors wound around a pair of rollers, respectively. A sensor 116 comprising a light emitting element and a photo-sensitive element is provided immediately adjacent to the insertion slit 101 for optically detecting insertion of a check card. A printing-stop position sensor 117 comprising a light emitting element and a photo-sensitive element is provided at the rear of the conveying mechanism 112 for detecting the check card 1 taken in and stopping the same at a predetermined position for printing. At an intermediate point between the conveying mechanism 113 and 114, a driving-stop sensor 117 is provided to detect that the check card 1 has been ejected from the ejection slit 115 and to stop the conveying mechanisms 110 to 114 for a predetermined period of time. These sensors 116 to 118 constitute a detecting section 120. A characteristic detecting device 40 is provided at an intermediate position of the conveying mechanism 110 for reading out a characteristics specific for the inserted check card 1. A read head 141 is provided at the mid-portion of the conveying mechanism 111 for reading out the data written on the magnetic stripe MS of the check card 1 and a write head 142 is provided in the conveying mechanism 113 for writing the data processed by a control system to be described later on the magnetic stripe MS of the check card 1. The conveying mechanism 112 is provided with a printer 104 to print the data imputted by the keyboard 102 onto the area MV of the check card 1. The conveying mechanism 112 is halted when the printer 104 is actuated for printing.

With the construction shown in the block diagram of FIG. 11, a CPU 150 (such as a micro-computer) controls the system as a whole. An operational program to be described later is stored in a ROM 151 while characteristic data detected by a characteristic detecting device 200 and data inputted by the keyboard 102 are stored in a RAM 153 to be read out and processed whenever necessary. A calender device 152 comprises a clock circuit for storing the chronological data (including the time, data and the day of the week) at the time a check is drawn by the check card drawing apparatus 100 or writing the date and time of drawing on the check card 1. The ROM 151, the calender device 152, the RAM 153 and the keyboard 102 are inter-connected to the CPU 154 via a bus line 154.

With these constitutions, the drawer inputs via the keyboard 102 password (such as a secret number) agreed in advance between the drawer and financial institution when the account was opened. If the passwords coincide, the amount in the check to be drawn is inputted via the keyboard 102. If the inputted password does not coincided with the one agreed, the drawer is judged as someone other than the one agreed by the financial institution. The check card 1 is therefore rejected as the conveying mechanisms 110 to 114 are reversed as described above. In order to draw a check using the check card drawing apparatus 100, a drawer inserts into an insertion slit 101 the check card 1 given to him in advance by a financial institution such as bank. An insertion sensor 116 detects the tip of the inserted check card 1 and drives conveying mechanisms 110 to 114 via the CPU 150 to send the check card 1 into the drawing apparatus 10. The characteristic detecting device 200 provided at the mid-portion of the conveying mechanism 110 reads out the characteristic specific to the check card 1 and the read out data is stored in the RAM 153. The data such as the drawer's account number, check number, and characteristic of the check card recorded in the magnetic stripe MS in advance is read out by a read head 141 provided at the mid-portion of the conveying mechanism 111. When the tip of the check card 1 reaches a printing-stop position sensor 117, the conveying mechanisms 110 to 114 are halted by means of the CPU 150. Then, the CPU 150 judges whether or not the account number allotted by the bank in advance coincides with the account number read out by the read head 141 as well as whether or not the characteristic data actually detected by the characteristic detecting device 200 coincide perfectly or with allowable and recorded on the magnetic stripe MS before it was detected and recorded on the magnetic stripe MS before it was given to the drawer by the financial institution. In the case where the account number and the characteristic data do not coincide or fall out of the allowable error, the conveying mechanisms 110 to 114 become reversed to return the check card 1 through CPU 150.

On the other hand, in the case where the account numbers coincide and the characteristic data either coincide or fall within the allowable error, it is judged whether the band processing code is included in the data recorded in the magnetic stripe MS which was read in the above step. The bank processing code is a code which is given to a drawn check card by a bank branch to which the card is brought for settlement. After identifying the bank processing code, the CPU 150 proceeds to the next routine for collating the check card (settled check card) with the transaction area in the RAM 153. If the bank processing code has not been given, the CPU 150 proceeds to the drawing routine of the check card (unused check card). The amount of money inputted via the keyboard 102 is indicated on the display unit 103 provided at the upper portion of the check card drawing apparatus 100 and comprising a liquid crystal display, and the drawer confirms whether the displayed figure is the amount to be actually drawn out in check or not. If the amount is correct, the confirmation key on the keyboard 102 is pressed, whereby the printer 104 is actuated by the CPU 150 to print out the amount in figures in the area MV of the check card 1 which has been taken in the check card drawing apparatus 100 and halted. The reason why the amount is visibly printed out on the area MV of the check card 1 is because the user who receives the check card would feel insecure otherwise and the credibility of the check card may be at stake.

When the printing operation in the area MV using the printer 104 is completed, the conveying mechanisms 110 to 114 are actuated by the CPU 150 and send the check card 1 toward the ejection slit 115; in the meantime, the sun stored in the RAM 153 and the chronological data outputted from the calender device 152 are respectively written on the magnetic stripe MS via the write head 142. New characteristic data detected by the detecting device 200 and stored in the RAM 153 are written in a prescribed area on the magnetic stripe MS to update the data. This is done because the check card 1 may get soiled in the course of transaction and it is necessary to store the latest data. At the same time, chronological data concerning drawing from the calender device 152, the drawn amount, etc, are stored in the transaction area in the RAM 153, whereby the state of transaction for a day or of check drawing for one month may be tabulated and printed out by the printer 104 to ensure safe and smooth drawing. When the check card 1 is ejected from the ejection slit 115 and the sensor 118 detects the tail end of the check card 1, the driving of the conveying mechanisms 110 to 114 is stopped by the CPU 150, whereby the drawing operation of the check card 1 is completed.

The check card 1 made of a sheet of paper was described in the above embodiment. However, the card can be made of any material so long as the characteristics inherent to the card may be read out. The shape and printing position of the card may also be arbitrarily selected. In the embodiment above the check card drawing apparatus is mounted onto the automatic check card issuing apparatus to read out the data from the drawing apparatus. However, it is also possible to read the data on-line or off-line via a transmission line. Although the number of check cards to be issued is determined via the keyboard, the cards may always be issued in a fixed number (for example 50).

In the above embodiment data inherent to the card are given by the bar code printed on the check card. However, as shown in Japanese Patent Publication No. 41549/1983, German Offenlegungsschrift No. 2829778 or British Patent No. 132665, the card may contain fluorescent substance for detection, or as shown in German Offenlegungsschrift No. 2635795 or Japanese Patent Laid-open No. 117081/1982 the card may contain a magnetic metal piece for detection. Furthermore, though the check card drawing apparatus described above has separate slits for insertion and ejection, one slit may be used for insertion and ejection purposes. In other words, the check card inserted into the insertion slit is conveyed to the reverse direction to be ejected from the slit after going through the above mentioned process.

As has been described in the foregoing, the check card negotiation system according to the present invention enables a prompt and safe operation both on the side of the drawer and the financial institution issuing the card. and rotionalize the check negotiation process. Since issuance and receipt of the check card is conducted by reading out the characteristice inherent to the check card, forgery or illicit use of the card may be prevented. Furthermore, the automatic check card issuing apparatus of the present invention is advantageous in that it enables automatic issuance of check cards by a simple operation, thereby facilitating the issuing of the check.

It should be understood that many modifications and adaptations of the invention will become apparent to those skilled in the art and it is intended to encompass such obvious modifications and changes in the scope of the claims appended hereto.

What is claimed is:

1. An automatic check card issuing apparatus which comprises a check card storage member for storing unissued check cards, a card extracting mechanism for taking out and transferring said unissued check cards one by one from the check card storage member, a check card conveying means for conveying and ejecting said unissued check cards transferred from said card extracting mechanism to an ejection slit, a means for recording the date on a prescribed position of said unissued check card which has been conveyed, an interface means for transmitting the data to and receiving the data from a check card drawing apparatus of a customer, and a control means for controlling said card extracting mechanism, said check card conveying means, said data recording means and interface means so as to read out the customer's data from said check card drawing apparatus via said interface means, to record the data on a prescribed position of said unissued check card via the data recording means and to issue the check cards from said ejection slit.

2. The apparatus as claimed in claim 1, wherein said data recording means includes an identifying and recording means for identifying the characteristics of each unissued check card as described in the above and for recording the same on said prescribed position.

3. The apparatus as claimed in claim 1, wherein said check card conveying means includes a temporary retaining member for retaining the conveyed check cards until they reach a predetermined number and conveying and ejecting these in a lot.

4. The apparatus as claimed in claim 1 which further includes a characteristic detecting means to detect the characteristics inherent to the card contained in an identification area of said unissued check card.

5. The apparatus as claimed in claim 4, wherein said identification area includes the bar code information of magnetic material printed thereon.

6. The apparatus as claimed in claim 5, wherein said bar code information is coated with a masking band of translucent and non-magnetic material.

7. The apparatus as claimed in claim 4, wherein said identification area contains a fluorescent substance.

8. The apparatus as claimed in claim 4, wherein said identification area contains a metal piece.

9. An automatic check card issuing apparatus which comprises a check card storage member for storing unissued check cards including an identification area and a magnetic stripe, a card extracting mechanism for taking out and transferring said unissued check cards one by one from said check card storage member, a check card conveying means for conveying and ejecting said unissued check cards transferred from said card extracting mechanism to an ejection slit, a member to which a check card drawing apparatus is mounted, a characteristic detecting device for detecting the characteristic of said identification area of said unissued check cards conveyed by said check card conveying means, a data recording means for recording the detected data by said characteristic detecting device on a magnetic stripe of said unissued check card and for printing necessary information on the check card, an interface means for transmitting the data to and receiving data from a check card drawing apparatus, and a control means for controlling read out of the customer's data from said check card drawing apparatus via said interface means as well as controlling said card extracting mechanism, said check card conveying means, said characteristic detecting device, and said data recording means.

10. The apparatus as claimed in claim 9 which further includes a printing member for printing and the issuing record on the check card and ejecting the card.

11. The apparatus as claimed in claim 9, wherein said control means includes a calendar device for printing the data and time of issue on said check card via said data recording means.

12. The apparatus as claimed in claim 9 which further includes a keyboard operable from outside for inputting necessary data such as the password, the number of check cards to be issued, etc.

13. The apparatus as claimed in claim 10 wherein the sheet printed by said printing section is ejected from said ejection slit.

14. The apparatus as claimed in claim 13 wherein said sheet is ejected on said check card after issuing said check card.

* * * * *